US008945500B1

(12) United States Patent
Zidan et al.

(10) Patent No.: US 8,945,500 B1
(45) Date of Patent: Feb. 3, 2015

(54) HIGH CAPACITY HYDROGEN STORAGE NANOCOMPOSITE MATERIALS

(75) Inventors: Ragaiy Zidan, Aiken, SC (US); Matthew S. Wellons, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 12/932,242

(22) Filed: Feb. 22, 2011

Related U.S. Application Data

(60) Provisional application No. 61/338,648, filed on Feb. 22, 2010.

(51) Int. Cl.
*C01B 31/02* (2006.01)
*C01B 3/00* (2006.01)
*C01D 15/00* (2006.01)

(52) U.S. Cl.
CPC ........... *C01B 3/0021* (2013.01); *C01B 31/0213* (2013.01); *C01D 15/00* (2013.01); *Y10S 977/735* (2013.01)
USPC ...................... 423/445 B; 977/735

(58) Field of Classification Search
CPC ... C01B 31/2013; C01B 3/0021; C01D 15/00
USPC ........ 423/445 B, DIG. 40; 977/734–735, 737
See application file for complete search history.

(56) References Cited

U.S. PATENT DOCUMENTS

| 6,146,791 A | 11/2000 | Loufty et al. |
| 2004/0101466 A1 | 5/2004 | Dillon et al. |

FOREIGN PATENT DOCUMENTS

| EP | 1219567 | 3/2002 |
| WO | WO 2004037714 | 5/2004 |
| WO | WO 2009089153 | 7/2009 |

OTHER PUBLICATIONS

R. O. Loutfy, et al. "Feasibility of Fullerene Hydride As a High Capacity Hydrogen Storage Material". Proceedings of the 2001 DOE Hydrogen Program Review.*
Szücs, A., et al. "On the mixed doping of fullerene films." Journal of Electroanalytical Chemistry 429.1 (1997): 27-35.*
Berseth, et al., "Carbon Nanomaterials as Catalysts for Hydrogen Uptake and release in NaAlH4"; Nano Letters, 2009, vol. 9, No. 4 pp. 1501-1505, Published on Web Mar. 3, 2009.
Margadonna, et al.; "LiC: A Polymeric Fulleride with a Two-Dimensional Architecture and Mixed Interfullerene Bonding Motifs"; Journal of American Chemical Society, 2004, 126 946) 15032-15033.
Ricco, et al.; "Superionic Conductivity in the Li4C60 Fulleride Polymer"; Physical Review Letters, PRL 102, 145901—pp. 1-4 (2009); 2009 The American Physical Society, Apr. 10, 2009.
Wellons, et al.; "Novel Catalytic effects of fullerene for LiBH4 hydrogen uptake and release"; IOP Publication; IOP Publishing Ltd. Namotechnology 20 92009) 204022 pp. 1-4.

* cited by examiner

*Primary Examiner* — Richard M Rump
(74) *Attorney, Agent, or Firm* — J. Bennett Mullinax, LLC

(57) ABSTRACT

A novel hydrogen absorption material is provided comprising a mixture of a lithium hydride with a fullerene. The subsequent reaction product provides for a hydrogen storage material which reversibly stores and releases hydrogen at temperatures of about 270° C.

9 Claims, 7 Drawing Sheets

| Mol RATIO $LiH:C_{60}$ | Wt % LiH | THEORETICAL $H_2$ wt %[a] | ABSORPTION TEMP. (C) | OBSERVED $H_2$ wt %[b] | APPROX. VALUE OF y FOR $Li_x\text{-}C_{60}\text{-}H$ [c] | # OF H PER Li[d] |
|---|---|---|---|---|---|---|
| 120:1 | 57 | 7.1 | 250 | 1.9 | 32 | 0.27 |
| 60:1 | 40 | 5.1 | 250 | 2.6 | 32 | 0.53 |
| 12:1 | 11.6 | 1.5 | 250 | 3.5 | 30 | 2.5 |
| 8:1 | 8.1 | 1.0 | 250 | 3.8 | 31 | 3.9 |
| 6:1 | 6.2 | 0.8 | 200 | 2.8 | 22 | 3.6 |
|  |  |  | 250 | 4.1 | 33 | 5.5 |
|  |  |  | 300 | 4.6 | 37 | 6.2 |
|  |  |  | 350 | 5.0 | 40 | 6.6 |
| 3:1 | 3.2 | 0.4 | 250 | 2.1 | 16 | 5.3 |
| 2:1 | 2.1 | 0.3 | 250 | 1.4 | 10 | 5 |

| Mol RATIO LiH:$C_{60}$ | Wt % LiH | THEORETICAL $H_2$ wt %[a] | ABSORPTION TEMP. (C) | OBSERVED $H_2$ wt %[b] | APPROX. VALUE OF y FOR $Li_x$-$C_{60}$-H[c] | # OF H PER Li[d] |
|---|---|---|---|---|---|---|
| 120:1 | 57 | 7.1 | 250 | 1.9 | 32 | 0.27 |
| 60:1 | 40 | 5.1 | 250 | 2.6 | 32 | 0.53 |
| 12:1 | 11.6 | 1.5 | 250 | 3.5 | 30 | 2.5 |
| 8:1 | 8.1 | 1.0 | 250 | 3.8 | 31 | 3.9 |
| 6:1 | 6.2 | 0.8 | 200 | 2.8 | 22 | 3.6 |
|  |  |  | 250 | 4.1 | 33 | 5.5 |
|  |  |  | 300 | 4.6 | 37 | 6.2 |
|  |  |  | 350 | 5.0 | 40 | 6.6 |
| 3:1 | 3.2 | 0.4 | 250 | 2.1 | 16 | 5.3 |
| 2:1 | 2.1 | 0.3 | 250 | 1.4 | 10 | 5 |

FIG. 1

PLOT OF NUMBER OF HYDROGEN ATOMS PER LITHIUM VS. THE MOL RATIO OF $C_{60}$:Li

US 8,945,500 B1

HIGH CAPACITY HYDROGEN STORAGE NANOCOMPOSITE MATERIALS

RELATED APPLICATIONS

This application claims the benefit of U.S. Provisional Application 61/338,648 filed on Feb. 22, 2010 which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards hydrogen absorption materials having enhanced absorption and desorption properties. This invention relates further to the use of carbon nanostructures in combination with complex hydrides to provide for novel materials having enhanced hydrogen kinetic properties. The invention relates further to the formation and use of metallofullerene nanocomposites of hydrofullerenes ($C_{60}H_x$) in combination with metals such as lithium to provide a lithium intercalated nanocomposite that can reversibly store and release hydrogen.

BACKGROUND OF THE INVENTION

This invention relates to materials that can store and release hydrogen. One promising class of materials for hydrogen storage include complex hydrides such as alanates and borohydrides which posses high hydrogen storage capacity. The kinetics of hydrogen uptake and release from these materials are such that catalysts are required to improve the reaction rates.

Hydrofullerenes ($C_{60}H_x$) are capable of storing up to 4.8 weight % hydrogen. However, a disadvantage to hydrofullerenes as hydrogen storage materials is the high temperatures in excess of 500° C. which are required for hydrogen desorption. Further, during desorption of hydrogen from hydrofullerenes, the release or formation of various hydrocarbons, including polycyclic aromatic hydrocarbons have been reported and addictive of irreversible decomposition of the fullerene nanostructure. As a result, hydrofullerenes are not suitable for multiple charge/discharge cycles of hydrogen absorption and release.

While a variety of catalyst and various additive protocols have been analyzed and set forth in the literature there remains room for variation and improvement in the art.

SUMMARY OF THE INVENTION

It is one aspect of at least one of the present embodiments to provide for the metallic addition from complex hydrides such as $NaAlH_4$ $LiAlH_4$, or $LiBH_4$, LiH, NaH and other lithium containing hydrides.

It is a further aspect that at least one of the present embodiments of the invention to provide mixtures of lithium hydride (LiH) with various carbon additives including carbon nanotubes of various diameters, and fullerenes so as to obtain a novel nanocomposite material having improved hydrogen uptake and release kinetics.

It is a further aspect of at least one of the present embodiments of the invention to provide for metallofullerene such as but not limited to lithium fullerene and sodium fullerene based nanocomposite hydrogen storage system in which the nanocomposite has a hydrogen storage capacity that can store multiple hydrogen atoms per metal atom.

It is a further aspect of at least one of the present embodiments of the invention to provide for a process of making metallofullerene such as lithium fullerene for hydrogen storage comprising the steps of reacting a lithium containing metal and fullerene in the presence of a solvent to form a first reaction product; subjecting the first reaction product to an elevated temperature thereby releasing said solvent and additionally reacting said lithium with said fullerene thereby forming a second reaction product, said second reaction product being a hydrogen storage composite having reversible hydrogen storage and release properties. The method can be used to form other compositions for with various stoichiometries for other non-storage applications.

It is a further aspect of at least one of the present embodiments of the invention to provide for a hydrogen storage composition according to the formula $Li_xC_{60}H_y$ where x has a value of between 1 to 10 and y has a value of between 0 to 70.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 1 is a table setting forth hydrogen storage properties of various lithium fullerene nanocomposites.

DESCRIPTION OF THE PREFERRED EMBODIMENT

Figure 2:
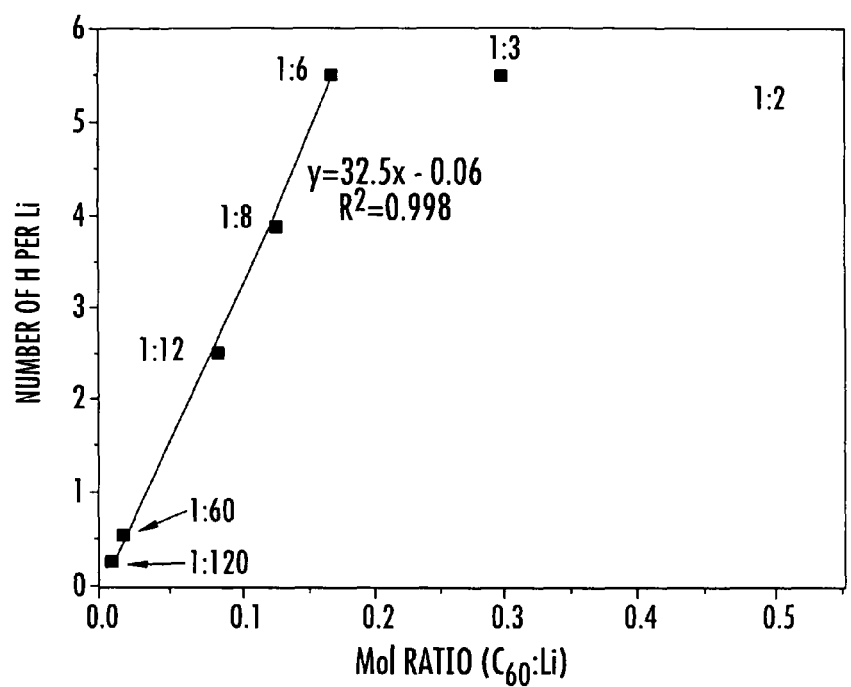
FIG. 2 is a graph setting forth a number of hydrogen atoms per lithium atoms versus the mol ratio of $C_{60}$:Li.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

LiH and $C_{60}$ fullerene combinations were used to create new hydrogen storage composites. Samples were prepared with a tetrhydrofuran (THF) solvent-based incorporation of fullerene and lithium hydride. The mixture of THF and LiH was stirred with Teflon coated magnetic stir bar for approximately 12 h. The solvent was removed under vacuum, resulting in a dark brown or black powder, dependent on the relative molar amounts of fullerene and LiH, and was collected for further characterization.

Chemicals used were purchased from commercial sources: LiH >99.5% (Aldrich), $C_{60}$ ~98% (Aldrich), and anhydrous THF >99.9% inhibitor fee (Acros). Temperature programmed description measurements and subsequent absorption steps were done a Sievert's apparatus, a Hy-Energy PCT Pro 2000.

In order to determine the preferred stoichiometry of the $Li_x$—$C_{60}$—$H_y$ nanocomposites, a series of samples were prepared by solvent-assisted mixing which the mol ratio of LiH: $C_{60}$ was varied from 120:1 to 2:1. $Li_x$—$C_{60}$—$H_y$ samples were prepared by 1 of 3 methods including the combination of fullerene-$C_{60}$ and LiH, Li metal or $Li_3N$. Lithium fluoride prepared from LiH fullerene was conducted with a solvent-assisted mixing of reactants by THF. For example, a sample with a 6:1 (Li:$C_{60}$) ratio was synthesized by the addition of LiH(0.0865 g) and $C_{60}$(1.3 g) to a Schlenk flask within an argon-filled glove box. Tetrahydrofuran (THF) was added and the mixture stirred with a Teflon coated magnetic stir bar for 6 hours. The solvent was removed under reduced pressure and remaining solids collected and the resulting product "as prepared" was used as the composite material for subsequent evaluation.

Lithium fluoride prepared and reported previously by others, using Li metal or $Li_3N$, have not resulted in a hydrogen storage material having the unprecedented characteristics of the present materials. A comparison of the present materials to those prepared using the lithium metal or $Li_3N$ reported in Serena, Margadonna, Daniele Pontiroli, Matteo Belli, Toni Shiroka, Mauro Ricco, and Michela Brunelli J A.M. Chem. SOC 2004, 126) was made. The comparison material is not consistently homogenous and lacked the characteristics of the present nanocomposite. Without being limited by theory, it is believed the claimed process and material utilizes a metatheses reaction resulting in an ionic exchange of Li ions between the hydride and fulleride (between LiH and $C_{60}$). The formation of the nanocomposite, using the current method, occurs at the atomic scale. In comparison, the methodology of Serena et. al., using $Li_3N$, stabilizes hydrogen bonds and prevents the ionic exchange between the hydride (LiH) and the fulleride ($C_{60}$). Similarly, using a Li metal allows a Li metal vapor to form that is easily clustered, forming particles of Li verses our method when atoms are driven into the fulleride The hydrogen desorption/adsorption properties of the materials were measured using a HyEnergy PCT Pro 2000 instrument. The PCT vessel and sample were heated at 2° C./min from room temperature to 380° C. with a temperature ramp time of approximately 3 hours. The samples were maintained at 380° C. for 2 hours during which an increase in pressure attributable to the release of H2 was observed. Following the desorption, the sample was then evaporated to remove any residual solvent and allowed to cool to 30° C. For the absorption of hydrogen, 105 bar $H_2$ was applied to the sample and heating to 350° C., followed by a 11 hour isotherm at 350° C. Subsequent reversible hydrogen cycling steps were conducted using the identical protocols.

The prepared samples were subjected to a series of desorption/absorption cycles on a Sievert's apparatus. The as prepared and subsequently rehydrided materials were analyzed by TGA-RGA to calculate the weight percent of $H_2$ desorbed from the nanocomposite in addition to detecting the presence of any volatile components. The TGA-RGA did not detect any volatile hydrocarbons during the dehydrogenation process and indicates the nanocomposite was stable and did not decompose.

The samples showed an unusual first desorption with the release of the solvent THF and $H_2$ upon heating. Without being limited by theory, it is Applicant's belief that the active hydrogen storage material is formed during this first desorption as part of metatheses reaction and/or annealing process. Following rehydrogenation of the samples, a much large quantity of $H_2$ was absorbed and released and at much lower temperatures of about 270° C. Results of a desorption study are summarized in FIG. 1.

As set forth in FIG. 1, the number of hydrogen atoms (y) stored in each composite ($Li_x$—$C_{60}$—$H_y$ is approximately the same value of 32 H atoms between mole ratios of 120:1 and 6:1 when samples were rehydrated at 250° C. under 105 bar $H_2$. This data suggests that there is a preferred ratio of Li:$C_{60}$ and combined with a unique formation method allow an optimum composition of the nanocomposite even with excess of lithium. However, it is believed that additional LiH is not incorporated into the active hydrogen storage material and is simply excess material. In the other extreme, the data suggests that there can also be lithium deficient materials such as loadings at a 3:1 or 2:1 in which there is not enough lithium present to fully form a hydrogen storage material having maximum hydrogen storage capacity.

As set forth in FIG. 2, there exists a direct linear relationship between the mol ratios of $C_{60}Li$ and the number of hydrogen atoms per lithium atom between the values of 1:20 to 1:6. The slope of the line is 32, which is nearly identical to the value of the number of hydrogen's (y) in the nanocomposites set forth in FIG. 1. As seen in FIG. 2, the 1:3 and 1:2 ratios do not follow this trend but the data emphasizes the importance of lithium in the hydrogen storage system. The composites still contain an excess of 5 hydrogen atoms per lithium atom with values very similar to the optimal 1:6 ratio.

For comparison purposes, graphite was used in place of $C_{60}$ in the nanocomposite formation process. The resulting graphite composites, intercalated with lithium displayed minimal hydrogen capacity under the absorption/adsorption conditions described above.

Based on the desorption/adsorption properties of the nanocomposites set forth above, it has been found that a optimum ratio of Li:$C_{60}$ is 6:1. As referenced above, excess of amounts of lithium do not enhance the ability of the hydrogen storage material to reversibly release and absorb hydrogen. Ratios below 6:1, while offering reversible hydrogen storage capabilities, do not have as a great hydrogen storage capacity.

As set forth in FIG. 2, the dehydrogenation properties of a lithium intercalated nanocomposite is compared in an initial state and in a rehydrided form with a hydrofullerene prepared from pure $C_{60}$ under identical conditions. As seen in FIG. 2, the as prepared material shows the desorption of residual THF which accounts for approximately 3 wt % of sample with desorption of 0.8 wt % of $H_2$. The weight percent loss due to the desorption of $H_2$ from the sample, is the expected hydrogen content of material based upon the amount of LiH used to make the sample. The release of $H_2$ from the as prepared sample is attributed as a reaction between LiH and $C_{60}$ to form a lithium intercalated fullerene, the formation of which releases hydrogen gas. The release of hydrogen gas from LiH was not expected during an initial desorption because pure LiH does not decompose until a temperature exceeds 670° C. It is believed that the lithium intercalated fullerene produced during this initial reaction is the active hydrogen storage material which is present in the subsequent absorption/desorption cycles.

Figure 3:
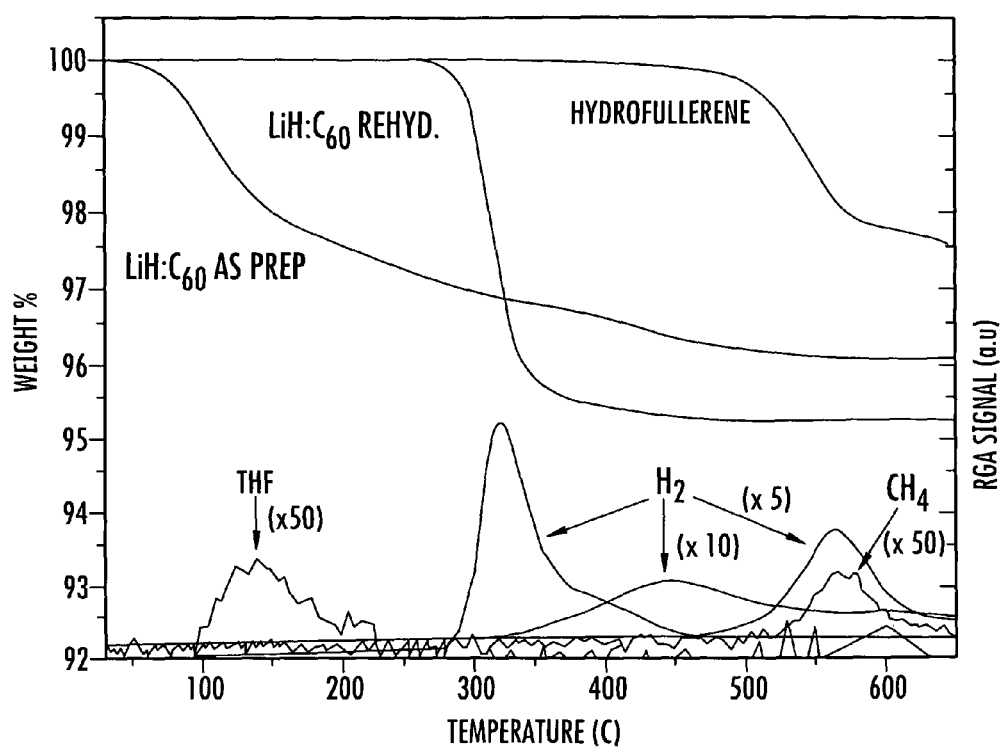
FIG. 3 is a graph setting forth the absorption properties of nanocomposites.

Upon rehydrogenation at 350° C. under 105 bar $H_2$, the lithium intercalated fullerene (6:1 mol ratio) was able to desorb up to 5 wt. % $H_2$ with an onset temperature of 270° C. 5 desorption cycles were evaluated with no perceived loss in hydrogen storage capacity. Further, no volatile hydrocarbons such as methane or ethane were detected during the cycles indicating no degradation of the lithium intercalated fullerene. As noted in FIG. 3, a hydrofullerine of pure $C_{60}$ sample shows a hydrogen desorption occurring at much higher temperatures of approximately 500° C. and at a lower weight percent (2.5 wt. %) than the rehydrogenated lithium intercalated fullerene. As noted in FIG. 3, the Pure $C_{60}$ hydrofullerene also releases methane indicating that an irreversible decomposition of the fullerene molecule occurs. It is further noted that the presence of hydrogen in the $CH_4$ gas in such that the actual free $H_2$ material released from the sample is likely much less than the 2.5 wt. % initially suggested by the data. The additional weight loss observed from the sample at temperatures above 625° C. is attributed to the sublimation of the $C_{60}$.

Figure 4:
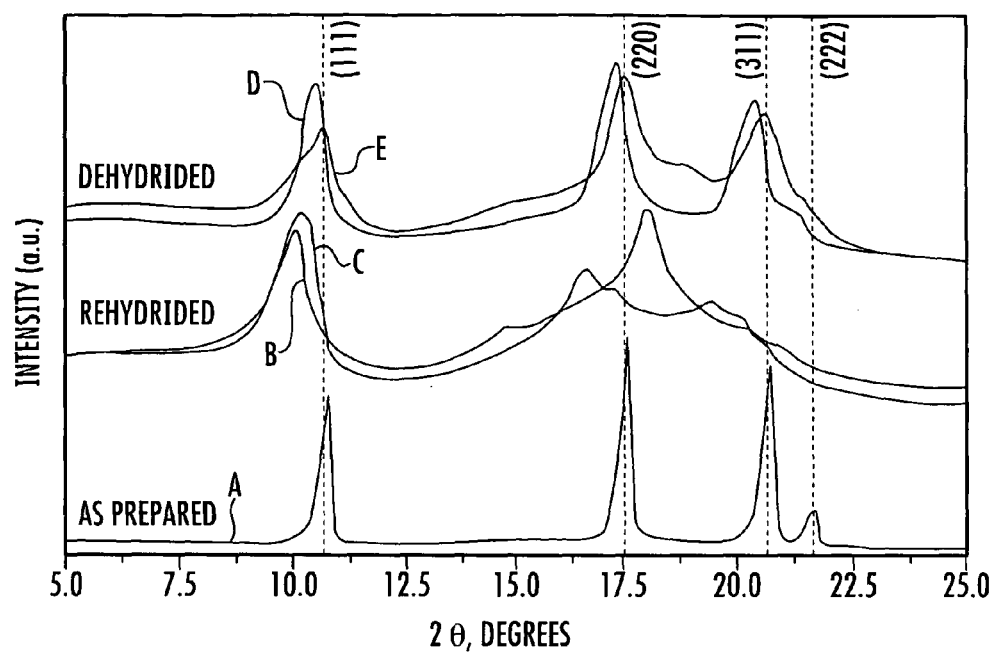
FIG. 4 is a graph comparing hydrogen desorption/absorption at various temperatures.

The effective rehydrogenation temperature variations of the nanocomposite was also examined. As set forth in FIG. 4, a comparison of a rehydrogenation temperature of 250° C. versus 350° C. was conducted on the composite material at various stages of the cycling process. A series of XRD scans were taken of the composite at three stages in the cycling process: as prepared; as dehydrided and rehydrided. As seen in FIG. 4, XRD scans taken of the 6:1 LiH:$C_{60}$ composite shows $C_{60}$ diffraction pattern changes during the cycling process and is additionally influenced by the temperature in which hydrogen absorption is performed.

It is further noted that the composite material changes color from dark brown/tan to black following dehydrogenation. The color change is consistent with observations within literature reports of hydrofullerenes undergoing color changes with the uptake of hydrogen. It is further noted that the broadening of fullerene peaks as seen in FIG. 4 is associated with the slight deformation and/or polymerization of $C_{60}$. The shift of the fullerene peaks to the lower 2θ after rehydrogenation is also consistent with the formation of a hydrofullerene.

The shift of the peak 111 to lower 2θ indicates that an increase in the unit cell parameter occurred upon rehydrogenation of the composite. An expansion of the unit cell parameter, value of 14.17 (as prepared) to 15.29 and 15.09 was observed for the rehydrated samples at 250° C. and 350° C. respectively. It is noted that there is a formation of a large broad peak at 18.12° two-theta upon rehydrogenation of the material at 350° C. While the identity of the new material is unknown, it is indicative of a novel hydrogen storage composite.

It is believed that the broadening of the peaks is attributable to a slight deformation of the $C_{60}$ molecule through the formation of new C-C and C—H bonds. It is believed that the new bonds provide a polymeric network of lithium intercalated $C_{60}$ that is produced during the subsequent hydrogen desorption/absorption cycles.

It is further noted that the reappearance of the 111, 220, 311 two-theta peaks in there original location in a sample rehydrogenated at 350° C. is further evidence of the reversible nature of the material. In the dehydrogenated sample that was rehydrogenated at 250° C., the 111, 220, and 311 peaks are slightly shifted to lower to two-theta positions which is believed attributable to the incomplete dehydrogenation at the lower temperature.

Figure 5:
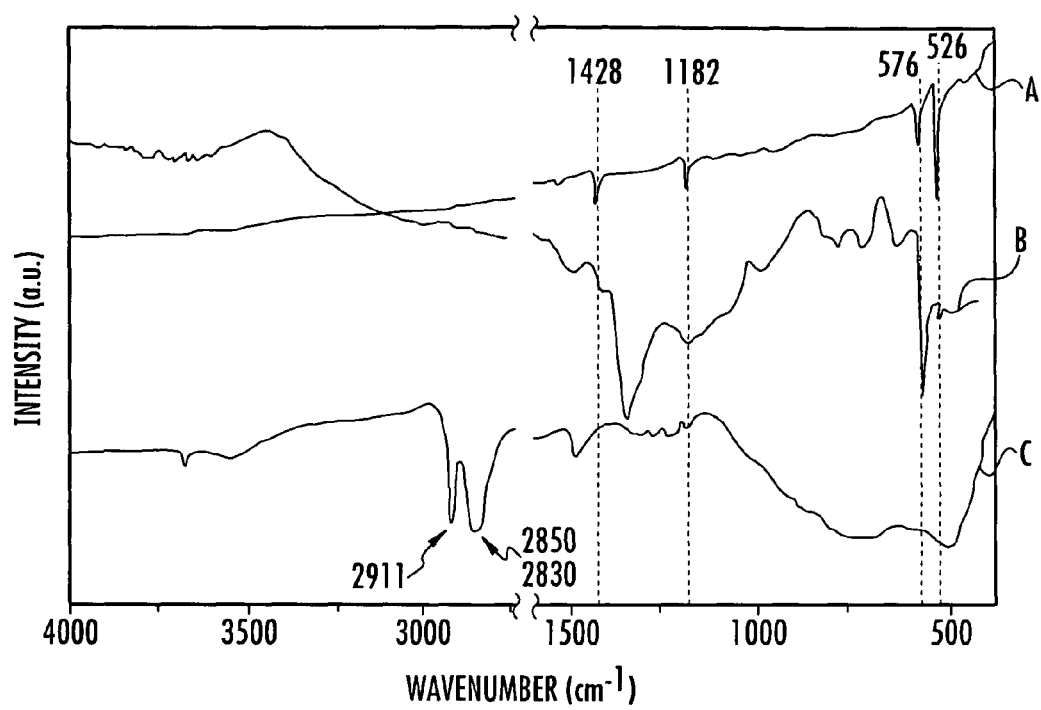
FIG. 5 is a graph setting forth infra-red spectrum of LiH:$C_{60}$ composites as various stages of a hydrogen desorption/absorption cycle.
Figure 6A:
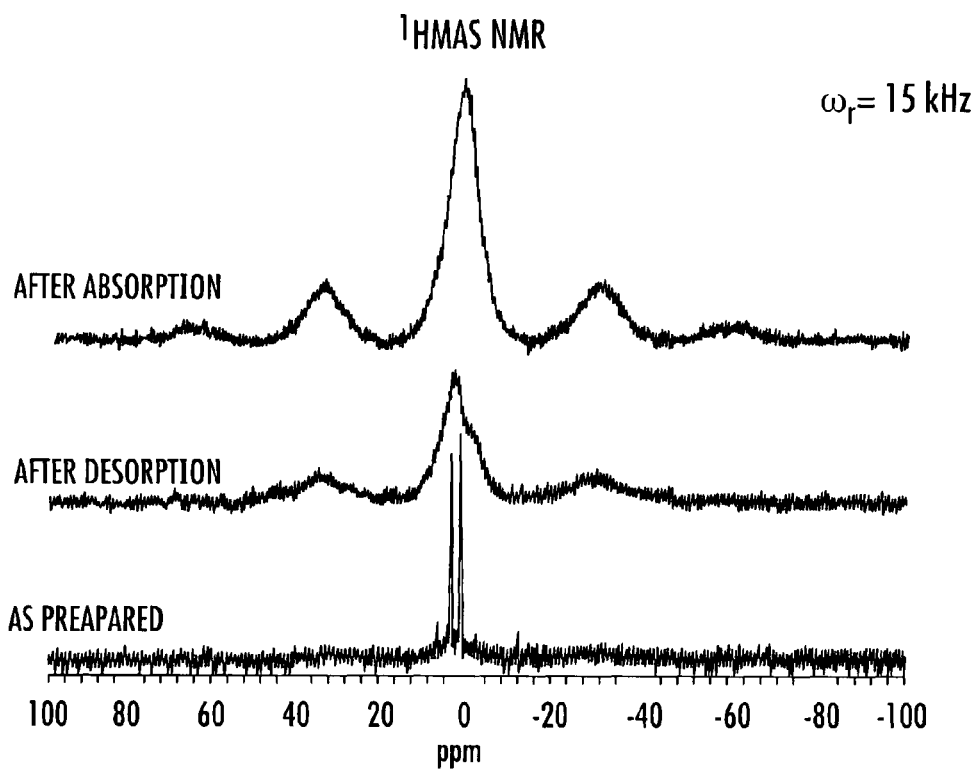
FIG. 6a-6d set forth MMR graphs of LiH:$C_{60}$ material of various samples and control materials.
Figure 6B:
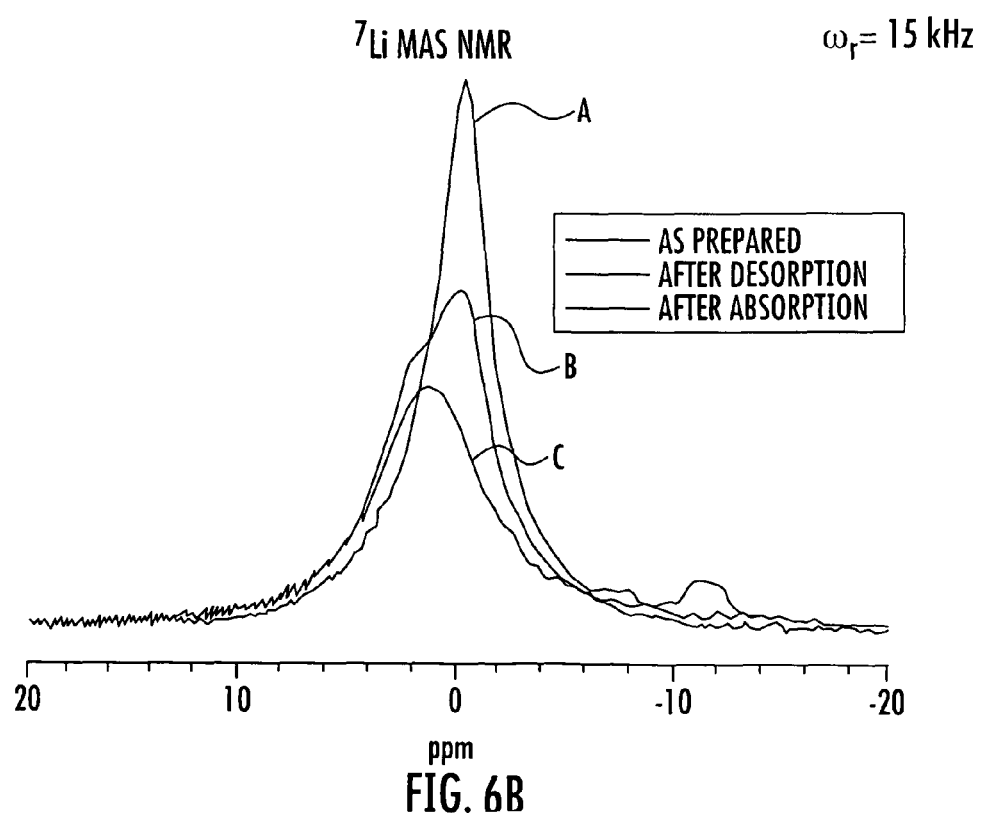
Figure 6C:
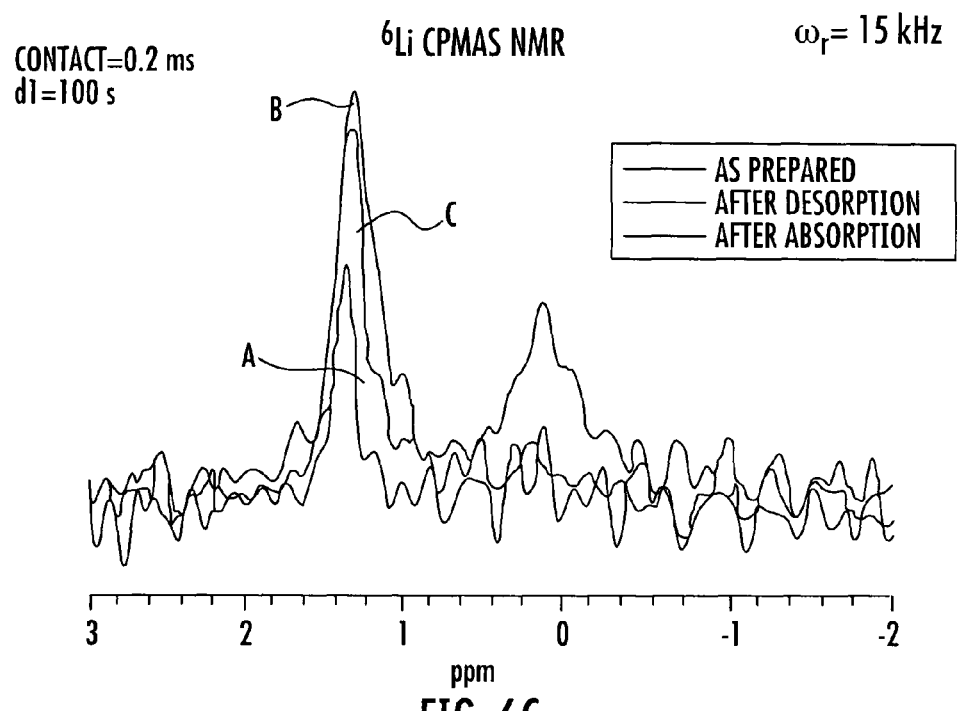
Figure 6D:
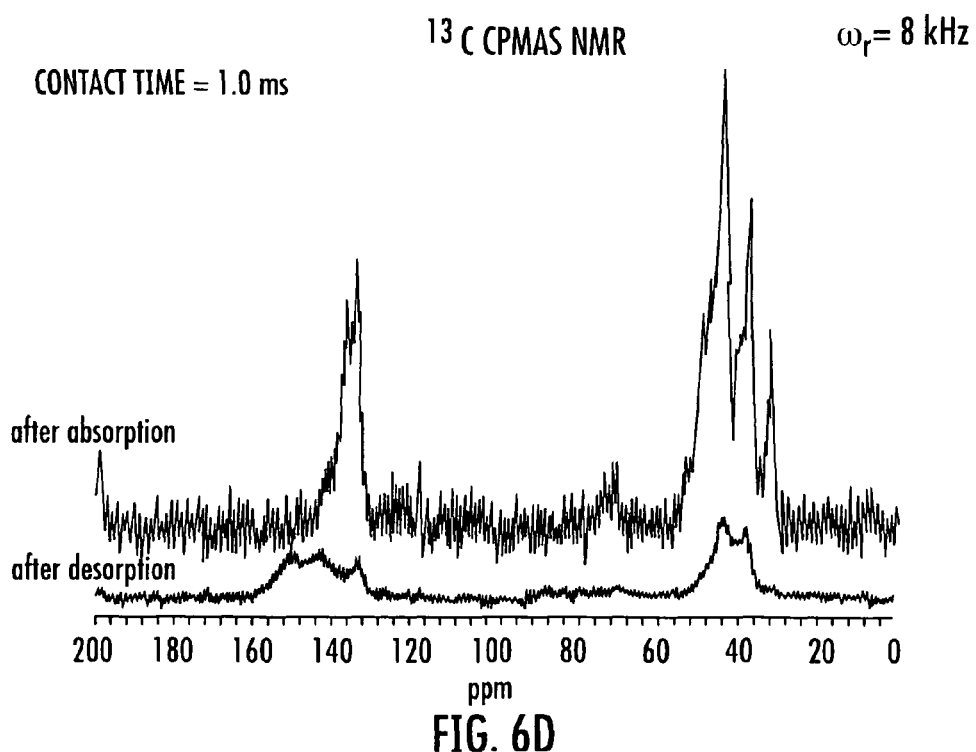

IR data also confirmed changes in the fullerene during the hydrogen desorption/absorption cycles (FIG. 5). The as prepared material closely resembles pure $C_{60}$ with 4 well-defined $F_{1u}$ peaks (526, 576, 1192, and 1428 $cm^{-1}$). In the dehydrided and rehydrided samples there are noticeable changes in the region between 3000 $cm^{-1}$-2700 $cm^{-1}$ and in the region <1500 $cm^{-1}$. In the rehydrided sample, the peaks that appear at 2911 $cm^{-1}$. 2850 $cm^{-1}$ and 2830 $cm^{-1}$ are attributed to the formation of C—H bonds. The new and multiple overlapping peaks that appear between 1500 $cm^{-1}$-1137 $cm^{-1}$ and are attributed to the formation of new C—C bonds between $C_{60}$ molecules to form a polymeric network intercalated with lithium. The fullerene peak at 1182 $cm^{-1}$ peak is still present in all three samples and only differs in intensity, while the 576 and 526 $cm^{-1}$ cm peaks are still prominent in the as prepared and dehydrided samples and indicates that $C_{60}$ retains most of its structural integrity over multiple cycles. The broad absorption feature from 1100 $cm^{-1}$ to 400 $cm^{-1}$ in the rehydrogenated sample resembles the IR spectrum of pure LiH.

MAS and CPMAS NMR was used to examine the change in environment of each component of the LiH-$C_{60}$ (6:1) material during the desorption/absorption of hydrogen (FIG. 6). The $^1$H MAS NMR in FIG. 5(a) shows the appearance of a broad and intense $^1$H signal after the desorption/absorption of hydrogen when compared to the as prepared material. Integration of the $^1$H signal shows that 75% more hydrogen (relative to the dehydrided sample) is added to the material after rehydrogenation. The sharp signals in the as prepared sample is due to residual solvent (THF). The $^7$Li MAS NMR (FIG. 6(b) and $^6$Li CPMAS NMR (FIG. 6(c)) show the presence of LiH in the as prepared and rehydrided sample (~0 ppm). Both spectra show a significant peak at 1.3 ppm and is possibly due to the Li ion intercalation into the $C_{60}$.

There is also an unusual far upfield shift at −11.5 ppm in the $^7$Li MAS NMR. Figure (d) is the $^{13}$C CP MAS NMR spectrum. Peaks at the upfiled (30-55 ppm range) are observed with strong CP efficiency even at very short CP contact time. The result indicates that part of the aromatic carbons within $C_{60}$ molecule underwent reduction to generate aliphatic carbons bearing C—H bonds.

From signal integration of the 13C MAS spectrum, about 17% of carbons are found in the aliphatic carbons, indicating about 10 out of 60 carbons were reduced. Considering a mixing ratio between LiH and $C_{60}$ was 6, some of aliphatic carbons are expected to be tertiary, meaning carbons without C-H direct bonds. The presence of tertiary carbon implicates the possible formation of $[C_{60}]_n$ clusters. After hydrogenation reaction, the $sp^3$ carbons increased significantly to about 63%, such that 38 out of 60 carbons are in the $sp^3$ side following hydrogenation. The value of 38 is close to the value of 40 obtained for the 6:1 composite (Table 1) that was rehydrogenated at 350° C. The $sp^3$ carbons renders relatively highly resolved carbon sites at 32, 38, and 45 ppm, of which position is related with $sp^3$ carbons that are surrounded by a certain number of $sp^2$ carbons.

Raman and UV-vis spectroscopy was also performed on the material during the hydrogen desorption/absorption cycles. The spectrum of the as-prepared sample, $Li_x$—$C_{60}$—$H_y$, is similar to that of molecular $C_{60}$, including sharp bands associated with totally symmetric $A_g$ modes at 494 and 1467 cm$^{-1}$. After the same material is cycled several times, the spectrum of the dehydrided sample retains some molecular $C_{60}$ character, but the sharp peaks are diminished in favor of broader bands. In the rehydrided sample, all evidence of molecular $C_{60}$ is gone, with the spectrum consisting solely of broad peaks. These results are consistent with the XRD data, in which the spectrum of the dehydrided sample retains some of the character of the as-prepared sample, while the rehydrided sample is clearly different. The persistence of $C_{60}$-like features after several cycles indicates that the fullerene cages remain intact, even if they are modified by polymerization or reaction with Li atoms.

UV-vis spectra of the as prepared and dehydrided materials are essentially identical to the spectrum of pure $C_{60}$ while the spectrum for hydrogenated material was very broad and relatively featureless when dissolved in 1,2-dichlorobenzene. The multiple desorption/absorption cycles also had a dramatic effect on the solubility of the material. The as prepared material had the same solubility as pure $C_{60}$ in the solvents tested and produced as a violet color in 1,2-dichlorobenzene. Upon dehydrogenation/rehydrogenation, the material was only sparingly soluble in 1,2-dichlorobenzene. The dehydrogenated material produced a red-brown color while the hydrogenated material had a light yellow color in solution. It was also determined that the dehydrogenated material was very soluble in acetonitrile and also produced a red-brown solution.

The results have established the ternary nanocomposite ($Li_x$—$C_{60}$—$H_y$) can reversibly store 5 wt % hydrogen with an onset temperature of −270° C. when a 6:1 ration of Li:$C_{60}$ is used. Spectroscopic characterization of the material suggests that the nanocomposite resembles a hydrofullerene, however, it does not suffer from the same drawbacks encountered in previous studies of pure hydrofullerenes ($C_{60}H_x$). The intercalated lithium atoms likely serve a dual purpose in this composite. (1) the Li atoms assist in the formation of a polymeric network resulting in a composite that is able to expand and contract upon the absorption/desorption, and (2) the charge transfer from the Li atom to the $C_{60}$ molecule results in the destabilization of the C—H bond resulting in the observed lower temperature of desorption.

As set forth in the publication entitled "Carbon Nanomaterials as Catalyst for Hydrogen Uptake and Release in a NaAlH$_4$" published in *Nano Letters* 2009 Volume 9, No. 4, 1501-1505 and which is incorporated herein by reference, a variety of carbon mixtures with complex hydrides were prepared and evaluated. As set forth in the publication, a variety of carbon nanostructures which had known attributes as possible hydrogen storage materials, can in fact be used as catalysts for hydrogenation/dehydrogenation of a complex hydride such as sodium alanate. Without being limited by theory, it is the Applicant's belief that by selecting and controlling the curvature of nanostructures can result in a significant catalytic improvement of carbon structures that are combined with complex hydrides.

Additional work showing the addition of a fullerene such as $C_{60}$ to LiBH$_4$ also brings about enhanced update and release of hydrogen of the resulting structure. Specific details are set forth in the publication entitled "Novel Catalytic Effects of Fullerene for LiBH$_4$ Hydrogen Update and Release" published in *Nano Technology* No. 20 (2009) 204022 and which is incorporated herein by reference for all purposes. As set forth in the referenced publication, the $C_{60}$ substrate was found to have a dramatic effect on the hydrogen removal energy.

The Materials identified and evaluated offer substantial improvements over previously known materials for hydrogen absorption and desorption kinetics. The combination of a fullerene with a hydrides such as LiH demonstrate a true synergistic effect which was unexpected. The resulting complex hydrides having catalytic additives of various carbon nanostructures represent a significant step forward in increasing hydrogen storage compactly as well as improved hydrogen release and absorption kinetics that will be needed for wide spread commercial adoption of a hydrogen based economy for transportation and energy needs.

Set forth as an Appendix to the present application is a draft publication entitled "Synthesis and Characterization of a $Li_x$—$C_{60}$—$H_y$ Nanocomposite for Reversible Hydrogen Storage". The draft publication includes data and figures offering further characterization of the hydrogen storage nanocomposite and methodologies used to evaluate the properties of the resulting nanocomposite and is incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth herein. In addition, it should be understood that aspects of the various embodiments may be interchanged, both in whole, or in part. Therefore, the spirit and scope of the invention should not be limited to the description of the preferred versions of embodiment contained therein.

That which is claimed:

1. A hydrogen storage composition according to the formula $Li_xC_{60}H_y$, where x has a value of between 1 to 10 and y has a value of between 0 to 70, and the composition reversibly stores and releases 5 wt % hydrogen and the composition is formed by a solvent-based incorporation of lithium hydride and a fullerene which is subsequently heated to a first hydrogen desorption temperature.

2. The hydrogen storage composition according to claim 1 wherein the hydrogen storage composition has an initial hydrogen release temperature of 270° C.

3. The hydrogen storage composition according to claim 1, wherein at a hydrogen release temperature of said composition, the composition releases no volatile hydrocarbons.

4. A hydrogen storage composition according to claim 1 wherein the ratio of Li:$C_{60}$ is a least 6:1.

5. A hydrogen storage composition consisting essentially of the formula $Li_xC_{60}H_y$, where x has a value of between 1 to 10 and y has a value of between 0 to 70, and the composition reversibly stores and releases 5 wt % hydrogen and the composition is formed by a solvent-based incorporation of lithium hydride and a fullerene which is subsequently heated to a first hydrogen desorption temperature.

6. The hydrogen storage composition according to claim 5 wherein the hydrogen storage composition has an initial hydrogen release temperature of 270° C.

7. The hydrogen storage composition according to claim 5, wherein at a hydrogen release temperature of said composition, the composition releases no volatile hydrocarbons.

8. A hydrogen storage composition according to claim 5 wherein the ratio of Li:$C_{50}$ is a least 6:1.

9. The hydrogen storage composition of claim 1 where the mole ratio of $LiH:C_{60}$ is 6:1 and y has a value of about 40.

* * * * *